March 29, 1938.  J. F. HOLLOWAY  2,112,530
BRAKE RIGGING
Filed March 10, 1936  3 Sheets-Sheet 1
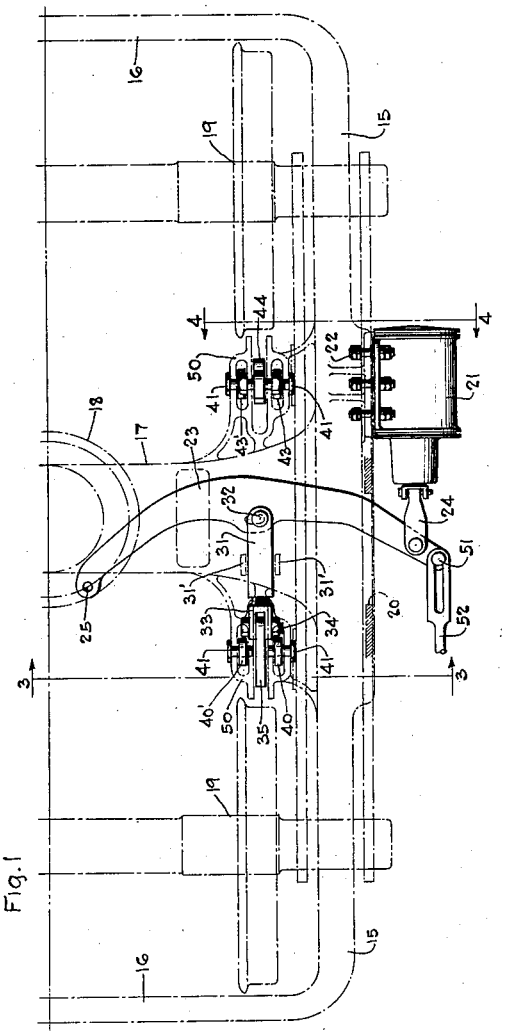
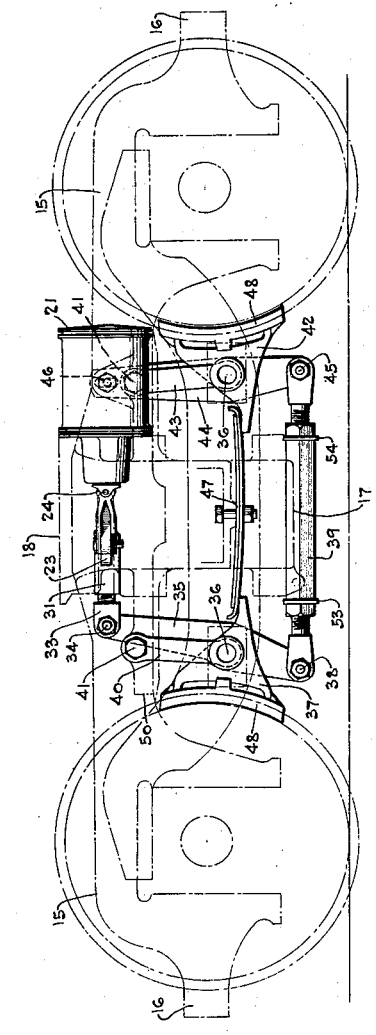
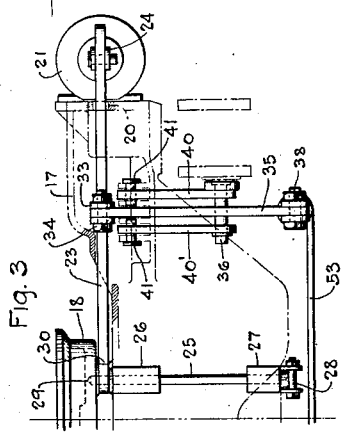
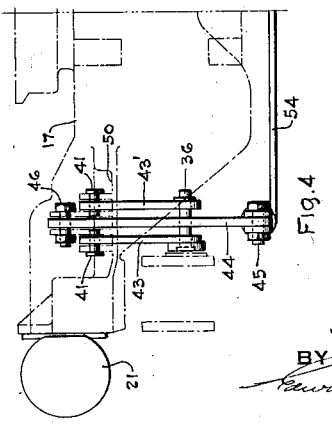
INVENTOR
Jesse F. Holloway
BY
ATTORNEY

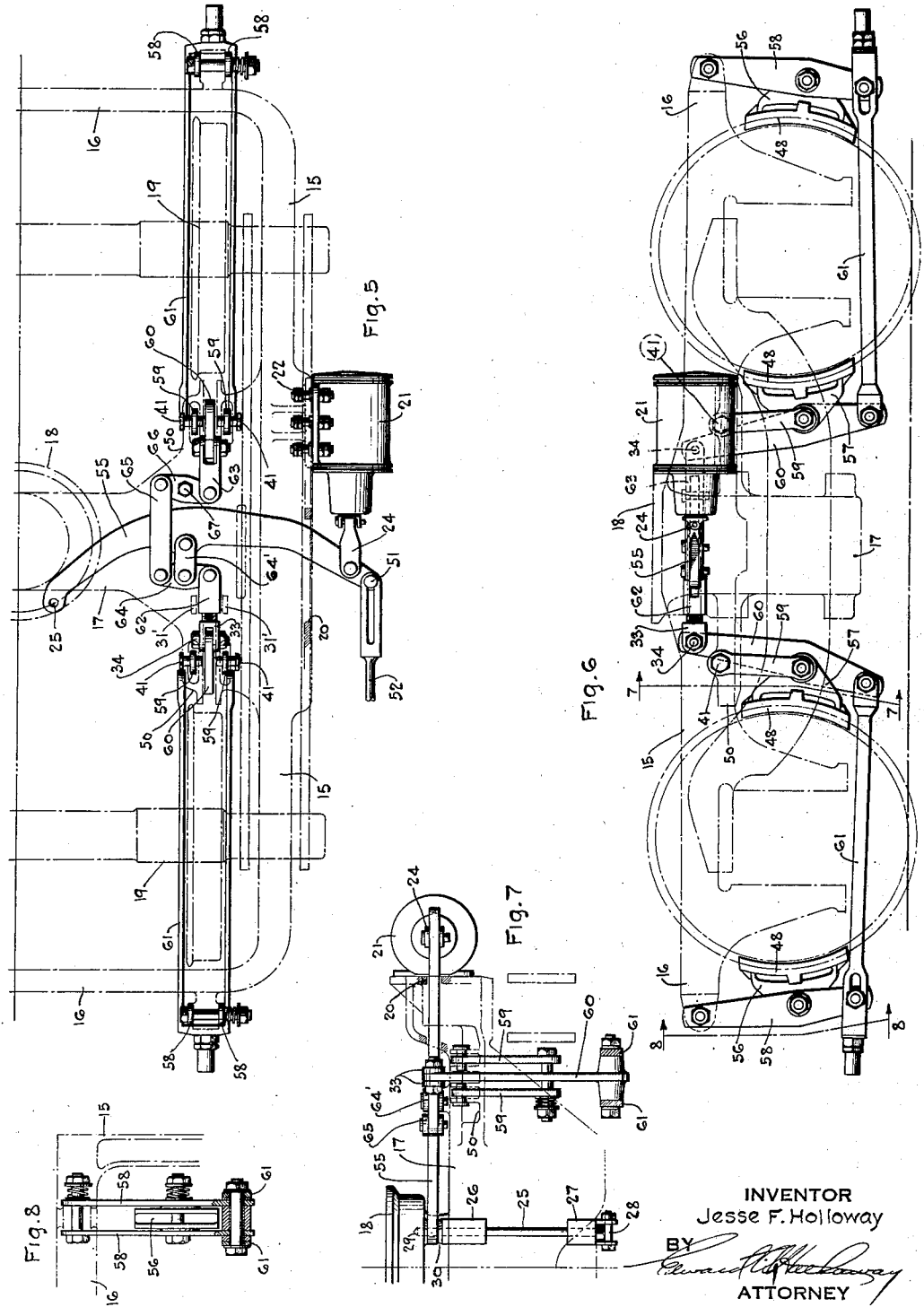

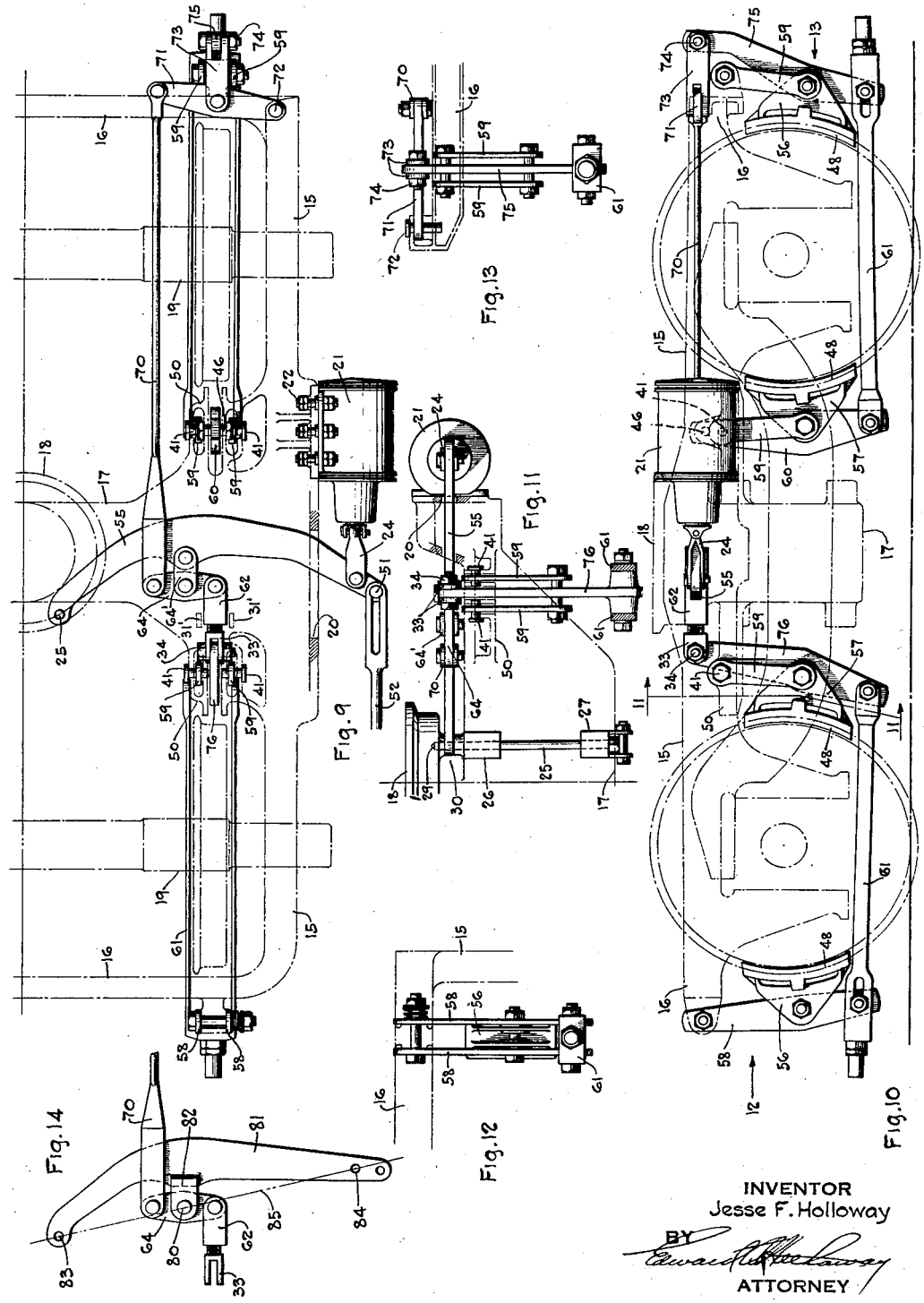

Patented Mar. 29, 1938

2,112,530

UNITED STATES PATENT OFFICE 2,112,530

BRAKE RIGGING

Jesse F. Holloway, Aldan, Pa.

Application March 10, 1936, Serial No. 68,091

11 Claims. (Cl. 188—33)

This invention relates generally to brake rigging and more particularly to an improved combination of a brake cylinder, lever and truck frame together with connecting links and levers for operating the brake heads whether used in a spreader or clasp type brake.

It is one object of my invention to provide an improved combination of elements in a brake rigging so constructed and arranged as to insure maximum efficiency in the transmission of power from the brake cylinder together with maintaining as nearly as possible a constant relation between the various levers and links throughout all movement of the brake rigging, thereby not only to minimize wear and tear of the various elements but also to insure more uniform and smooth operation of the brake rigging as well as to avoid possible skewing thereof.

A further and more specific object is to provide improved means whereby fixed fulcrums of the brake rigging may be effected in a simple and yet rigid and accessible manner. A further object is to provide an improved combination of links and levers that is particularly adapted for cooperation in my improved combination.

In the specific aspects of the invention I specifically accomplish the foregoing objects by mounting the brake cylinders on the side of the truck side sills and providing lateral openings therein through which horizontal cylinder levers extend to fixed fulcrum points substantially adjacent the center pin truck bearing while compression brake rods are operatively connected to said cylinder levers at a point to deliver correct braking power to the remaining levers.

Other objects and advantages will be more apparent to those skilled in the art from the following description of the accompanying drawings in which:

Fig. 1 is a plan view of one side of a truck embodying my improved brake rigging specifically of the spreader type;

Fig. 2 is a side elevation of Fig. 1;

Fig. 3 is a transverse section taken substantially on the line 3—3 of Fig. 1;

Fig. 4 is a transverse section taken substantially on the line 4—4 of Fig. 1;

Figs. 5 and 6 are respectively plan and side elevations of a truck embodying my improved rigging specifically of the clasp brake type;

Fig. 7 is a transverse section taken on the line 7—7 of Figs. 5 and 6;

Fig. 8 is an end elevation of one brake head hanger taken substantially on the line 8—8 of Fig. 6;

Figs. 9 and 10 are plan and side views of a truck embodying my improved brake rigging also specifically of the clasp type;

Fig. 11 is a transverse section taken substantially on the line 11—11 of Fig. 10;

Fig. 12 is an end elevation of the brake head hanger viewed in the direction of arrow 12 of Fig. 10;

Fig. 13 is an end elevation of the other end of the brake rigging viewed in the direction of arrow 13 of Fig. 10;

Fig. 14 is a further modification of the cylinder lever and compression member.

In the particular embodiments of the invention which are disclosed herein merely for the purpose of illustrating certain specific forms among possible others that the invention might take in practice, I have shown in dotted outline in Fig. 1 a conventional form of truck only one-half of which is shown as the other half together with my improved rigging is identical. Hence in the description of all forms of brake rigging and truck structure mentioned herein it will be understood that reference is had to a duplicate symmetrical structure for the other side. The truck specifically disclosed herein for purposes of illustration is of the well-known equalizer type which does not employ a spring supported bolster but instead includes a usual side sill 15, end sills 16 and a transom 17 upon which a usual center pin bearing 18 is mounted, all formed as a single integrally connected unit. Usual spaced wheel and axle units 19 support the truck frame through usual journal boxes, springs and equalizing beams which need not be described as they do not constitute a part of my present invention. A lateral opening 20 is provided in the side sill 15 at an elevation slightly above the top of transom 17 and in substantial transverse alignment therewith. A brake cylinder 21 is secured to the side sill as by bolts 22 or other suitable means, the cylinder being positioned slightly to one side of opening 20 and with the cylinder axis substantially in the horizontal plane of said opening. The foregoing description of the truck elements will suffice for all of the modifications of brake rigging hereinafter described.

The brake rigging of Figs. 1 to 4 includes a horizontal cylinder lever 23 overlying transom 17 and extending through side sill opening 20 for pivotal connection to a cylinder push rod 24. The cylinder lever extends for a substantial distance inwardly and terminates adjacent center pin bearing 18 for pivotal connection to a fixed fulcrum pin 25 (Figs. 1 and 3). This pin is supported in upper and lower bosses 26 and 27 secured to or formed integrally with the side of transom 17. A keeper bolt 28 extends through suitable flanges of boss 27 so as to engage the head of pin 25 and prevent it from falling downwardly. The pin is normally insertable upwardly through bosses 27 and 26 after which keeper bolt 28 is secured in position. The upper end of pin 25 is received in a recess 29 in the center pin bearing 18, thereby providing a very substantial pin support on each side of lever 23. The center pin bearing is preferably provided with an annular recess 30 at its lower portion so as to receive the fulcrumed end of lever 23.

One end of a compression brake rod 31, which is laterally supported by suitable stationary guides 31' formed on the transom of the truck frame, has a pin and slot connection 32 with lever 23 while the other end is provided with an adjustably threaded clevis or jaw 33 pivotally connected as at 34 to a vertical brake lever 35 (Fig. 2). The brake lever is pivotally connected as at 36 to a brake head generally indicated at 37 while the lower end of the brake lever is pivotally connected as at 38 to a bottom compression rod 39. A pair of brake head hangers 40, 40' have their lower ends pivotally connected as at 36 to support a brake head 37, while their upper ends are supported by the truck frame through fixed ears and pins 41. The other brake head 42 is similarly supported by a pair of brake headhangers 43, 43' and is operated by a vertical brake lever 44, the lower end of which is pivotally connected as at 45 to the compression rod 39 while the upper end has a pin and slot connection 46 with ears on the truck frame. A usual brake head levelling spring 47 engages the brake heads to maintain the brake shoes 48 concentric to the wheels. To support the various fixed pivots for the brake levers above described, the truck frame may be formed with upstanding ears or jaws in any suitable or usual manner such as generally indicated at 50 (Fig. 1) to receive the pivot pins, studs or bolts. The outermost end of cylinder lever 23, and similarly for the cylinder levers of the other modifications, is provided with an opening 51 (Fig. 1) to receive a hand operated brake rod 52.

In the operation of the form shown in Figs. 1 and 2, it is seen that movement of brake cylinder push rod 24 will cause cylinder lever 23 to pivot around its fixed fulcrum point 25 located adjacent the truck center pin bearing, thereby causing compression brake rod 31 to move in a substantially straight line without any appreciable inherent distortional angularity and thereby minimizing the possibility of lateral thrust and friction on the guides 31'. The rod 31 thus swings vertical brake lever 35 in a counterclockwise direction during application of the brake, and accordingly pushing on lower compression rod 39 to swing brake lever 44 in a counterclockwise direction about its upper pivot 46, thus completing the application of the brake shoes to the wheels. During this operation the various links, levers and brake heads are not subjected to any substantial skewing or other misaligning forces which if present would cause excessive wear of the pivot pins and improper contact of the brake shoes with the wheel tread. It is also seen that the long length of cylinder lever 23 permits a maximum stable couple to be exerted thereon through the instrumentality of the upper and lower horizontal walls adjacent the pin 29 and similar walls forming opening 20, thereby insuring minimum vibration or other disturbing influences on the braking system. To provide a mechanical tie between the brake rigging on opposite sides of the truck, the lower compression rods 39 on each side are rigidly connected to cross tie rods 53 and 54 (Figs. 2 and 4). My improved arrangement of links and levers operated by the main horizontal cylinder lever 23, with its pivotal connection near the center of the truck and with the operative connection of the links to the cylinder lever in substantially the vertical plane of the wheels, insures efficient and stabilized operation of the brake heads.

*Modification of Figs. 5 to 8.*—The brake cylinder and truck elements carry the same reference numbers as for the preferred form shown in Figs. 1 and 2. The horizontal cylinder lever 55 is also supported at its inner and outer ends in the same manner as at 23 in Fig. 1. To operate a clasp type of brake from this cylinder lever and to maintain the brake rigging as compact as possible combined with freedom from distortional angularity of the parts, I have incorporated with my improved rigging identical clasp type brakes for each wheel. Each brake has heads 56 and 57, head 56 being supported by a vertical brake lever 58 while head 57 is supported by a brake head hanger 59. A vertical brake lever 60 is crossconnected at its lower end to lever 58 by a tension rod 61 while its upper end is pivotally connected to a compression rod 62 (Fig. 5). Inasmuch as the brake rigging for the other wheel is identical, it will suffice to state that rigging thereof is also operated by a compression rod 63. To commonly connect the compression rods 62 and 63 to the main horizontal cylinder lever 55, an equalizing lever 64 is pivotally connected at one end to rod 62 and at its other end to an equalizing link 65. The link 65 is connected to one end of a lever 66 whose other end is pivotally connected to rod 63. The lever 66 has a fixed fulcrum 67 formed by a stud, bolt or other suitable means secured to the top of the truck frame.

In the operation of the modification shown in Figs. 5 and 6, the movement of the brake cylinder piston will cause cylinder lever 55 to move compression rod 64', equalizing lever 64, link 65 and rod 62 in the same direction whereupon lever 66 will rotate around its fulcrum 67 to cause movement of rod 63. Compression rods 62 and 63 acting on lever 60 apply the brake shoes to the wheels. The combination of elements shown in this modification has all the advantages and results above described for the preferred form.

*Modification of Figs. 9 to 13.*—In this form I have again employed a clasp type of brake, but instead of operating the brakes for the righthand wheels through a compression rod such as 63 and an intermediately fulcrumed lever such as 66, I provide a rod 70 corresponding broadly to rod 65 and extend the same to the end of the truck for pivotal connection to one end of a lever 71 whose other end has a fixed fulcrum 72. A pull rod 73 is connected at one end to an intermediate point of lever 71 and its other end is pivotally connected as at 74 (Fig. 10) to the upper end of a vertical brake lever 75 corresponding broadly to the levers 60 of Fig. 6, except that lever 75 is located at the remote end of the truck instead of between the wheels as in Fig. 6.

The mode of operation of the modification shown in Figs. 9 and 10 is the same as in Figs. 5 and 6 except that link 70 functions to operate the right wheel brakes through vertical brake lever 75 while the left wheel brakes are operated through a vertical brake lever 76 in identically the same manner as the brakes are operated by lever 60 of Fig. 6. This Figs. 9 and 10 modification also has the same advantages of operation, construction, stability and relative simplicity as for the other modifications.

*Modification, Fig. 14.*—To eliminate any possible necessity of lateral guides, such as 31', Fig. 2, I provide a fulcrum pin 80 in immovable relation to a cylinder lever 81, this pin extending through an extension 82 rigidly formed with the lever either as a part thereof or as a U-shaped strap riveted thereto. The axes of the fixed fulcrum 83, pin 80 and cylinder pin 84 are preferably on a straight line 85. This arrangement when used accentuates the many advantages of the other modifications.

It will of course be understood that various changes in details of construction and arrangement of parts may be made by those skilled in the art without departing from the spirit of the invention as set forth in the appended claims.

I claim:

1. A brake rigging comprising, in combination, a truck frame having a side sill and transom, a brake cylinder mounted on the side of said side sill, a horizontal cylinder lever extending from the cylinder inwardly to a point substantially adjacent the center of the truck, means for pivotally supporting the inner end of said lever by said transom, and brake elements operatively connected to a substantially intermediate portion of said lever.

2. The combination set forth in claim 1 further characterized in that the operative connection of the brake elements with said lever is substantially in the vertical plane of the truck wheels.

3. The combination set forth in claim 1 further characterized in that the side sill is provided with a slot through which the cylinder lever extends.

4. A brake rigging comprising, in combination, a truck frame having a side sill and a transom provided with a center pin bearing, a brake cylinder supported by the side sill, a horizontal cylinder lever extending from said cylinder inwardly to a point adjacent said center pin bearing, means providing a fixed fulcrum for the inner end of said lever adjacent said center pin bearing, and brake elements operatively connected to an intermediate point of said lever.

5. The combination set forth in claim 4 further characterized in that said cylinder lever overlies said transom for substantially the full distance thereof from the side sill to the center bearing.

6. The combination set forth in claim 4 further characterized by the provision of a recess in said center bearing to receive said cylinder lever.

7. A brake rigging comprising, in combination, a truck frame having a side sill and transom, a brake cylinder supported by said side sill, a horizontal cylinder lever extending from the cylinder inwardly to a point substantially adjacent the center line of the truck, a fixed fulcrum pin for the inner end of said lever, means for supporting said pin by said transom for insertion or removal from a point below said truck, and braking elements operatively connected to an intermediate point of said lever.

8. The combination set forth in claim 1 further characterized in that the braking elements include a spreader type brake having vertical brake levers connected at their lower ends by a compression rod, and a compression rod pivotally connecting said cylinder lever to the upper end of one of said vertical braking levers.

9. The combination set forth in claim 1 further characterized in that the braking elements include a spreader type brake having vertical brake levers connected at their lower ends by a compression rod, a compression rod pivotally connecting said cylinder lever to the upper end of one of said vertical braking levers, a pair of brake head hanger links one on each side of one of said vertical brake levers, and another pair of hanger links one on each side of the other of said vertical brake levers.

10. The combination set forth in claim 1 further characterized in that the braking apparatus is of the clasp type having vertical brake levers, an equalizing lever pivotally connected to said cylinder lever, and rods connecting the outer ends of said equalizing lever to said brake levers.

11. The combination set forth in claim 1 further characterized in that the braking apparatus is of the clasp type having vertical brake levers for each wheel and located between the same, an equalizing lever pivotally connected to said cylinder lever, and rods connecting said equalizing lever with said brake levers.

JESSE F. HOLLOWAY.